Figure 1:
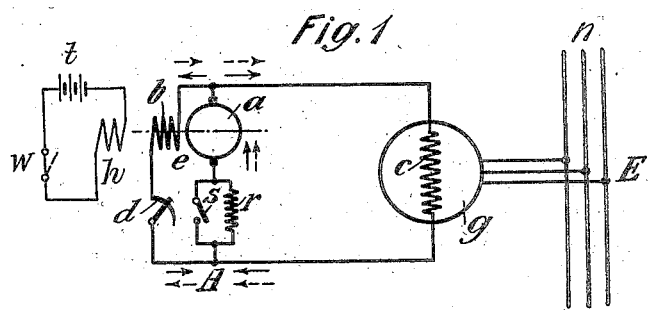

Nov. 29, 1927.

R. RÜDENBERG 1,650,910

METHOD OF DEENERGIZING GENERATORS

Filed Nov. 25. 1924

Inventor
Reinhold Rüdenberg
by Knight Bros
attorneys

Patented Nov. 29, 1927.

1,650,910

UNITED STATES PATENT OFFICE.

REINHOLD RÜDENBERG, OF BERLIN-CHARLOTTENBURG, GERMANY, ASSIGNOR, BY MESNE ASSIGNMENTS, TO WESTINGHOUSE ELECTRIC & MANUFACTURING COMPANY, A CORPORATION OF PENNSYLVANIA.

METHOD OF DEENERGIZING GENERATORS.

Application filed November 25, 1924, Serial No. 752,202, and in Germany November 26, 1923.

My invention relates to improvements in the method of de-energizing generators.

The hitherto known arrangements for quickly de-energizing generators and more particularly large alternating current generators have a number of drawbacks. If a resistance is connected into the main exciter circuit of the alternating current generator the time-constant for the weakening of its field is comparatively small but the resistance when taken large enough causes considerable excess voltages in the generator when it is switched in. It does, furthermore, not bring the exciting current right down to zero but a considerable residual current remains which causes a corresponding residual alternating voltage which is not admissible.

If the de-energizing resistance is inserted into the shunt circuit of the exciter, the exciter itself becomes quickly de-energized but the field of the large alternating current machine is weakened only slowly because with its great time constant it is able to generate equalizing currents in the main exciter circuit. In this case also a considerable alternating voltage of the generator remains which is generated by its own remanence as well as the remanence of the exciter. A considerable remanence current generated by the remanence of the exciter then flows in the exciter winding of the main machine which in machines with strong regulation of the exciter current amounts to a considerable fraction of the no-load exciter current. To this must be added the effect of the remanence field of the generator so that in spite of the switching in of a large field-weakening resistance the network voltage goes down to only approximately one third of the rated voltage.

According to my invention the drawbacks mentioned are avoided by returning the field energy of the generator back into the exciter, with the result of thereby changing the polarity of the exciter through the reversal of the exciter current. This may be brought about by inserting a resistance in the rotor branch of the exciter.

An embodiment of my invention is diagrammatically illustrated in the drawing affixed to this specification. The drawing represents in:—

Fig. 1 a wiring diagram and in

Figure 2:
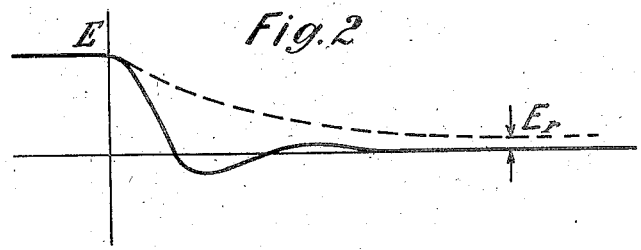

Fig. 2 the de-energizing characteristic of the generator.

Referring to Fig. 1 $g$ is the generator with the exciter winding $c$, the generator supplying current to the network $n$ at the voltage E. The generator $g$ is excited by the exciter $e$ comprising a rotor $a$ and a shunt winding $b$ which can be adjusted by means of a regulating resistance $d$ in correspondence with the load. According to my invention a resistance $r$ is connected into the circuit between the rotor $a$ and the branching point A of the two exciter circuits and parallel to this resistance a switch $s$ is provided. In regular service the resistance $r$ is short-circuited by the switch $s$. When de-energizing the generator the switch $s$ is opened. The field energy of the generator $g$ now flows back into the exciter $e$ the poles of which latter now become reversed since the current still flowing out of the exciter windings of the generator in the same direction in which they were formerly supplied by the exciter machine, will flow through the field windings of the exciter opposite to the normal direction as indicated by the full line and dotted arrows, the latter showing the flow of current immediately after putting in the resistance $r$. To assist the decrease of the currents the shunt regulator $d$ may be adjusted as required.

While the exciting current and thus also the alternating voltage E of the generator decreases in the hitherto used systems according to the broken line in Fig. 2 in one continuous drop and a considerable residuum E$r$ remains, the voltage of generators de-energized according to this invention decreases at a rate, resembling a damped oscillation, and substantially in a manner shown by the full line. The decrease thus takes place quicker on the one hand and almost completely on the other hand because the hysteresis phenomena of the iron disappear almost completely with gradually decreasing magnetization as is well known.

In case the de-energization should accidentally drop right down to zero field value, so that the exciter would not re-energize itself when the system is again thrown into operation, it may at any time be brought again to the self-excited voltage by an always available source of continuous current, for instance a battery $t$ as shown which may be thrown in by switch $w$.

Such a continuous current excitation is preferably always employed when the entire system is again thrown into operation, no matter whether full de-energization or final pole changing of the exciting machine for reversed polarity has taken place or not in order that the right self-excitation may always be attained again with certainty. If the separate weak continuous current excitation of the exciter is also maintained during the service, the advantage is obtained that the exciter is stably regulatable within very wide voltage limits without the necessity of providing other auxiliary means. The weak separate excitation may act upon a separate exciter winding $h$ as shown or directly upon the field winding of the exciter.

What I claim is:—

1. The method of quickly de-energizing generators separately excited from an exciter machine which consists in introducing a resistance into the rotor branch of the exciter machine, causing an appreciable amount of residual current from the generator field to counteract the normal field excitation of the exciter machine.

2. The method of quickly de-energizing generators separately excited from a shunt wound exciter machine, which consists in introducing a resistance into the rotor branch of the exciter machine, causing an appreciable amount of residual current from the generator field to flow through the exciter shunt in a direction opposite from normal, and in suitably varying the resistance of the shunt circuit of the exciter.

3. The method of quickly de-energizing generators separately excited from a shunt wound exciter machine, which consists in introducing a resistance into the rotor branch of the exciter, causing an appreciable amount of residual current from the generator field to flow through the exciter shunt winding in a direction opposite from normal and in re-energizing, after complete de-energization of the generator, the field of the exciter in normal direction by a source of direct current.

4. The method of quickly de-energizing generators separately excited from a shunt wound exciter machine, which consists in introducing a resistance into the rotor branch of the exciter, causing an appreciable amount of residual current from the generator field to flow through the exciter shunt winding in a direction opposite from normal and in simultaneously suitably varying the resistance of the exciter shunt winding and in re-energizing after complete de-energization of the generator, the field of the exciter in normal direction by a source of direct current.

In testimony whereof I affix my signature.

REINHOLD RÜDENBERG.